March 28, 1950     G. A. GILLEN     2,501,814
ELECTRIC MOTOR
Filed Sept. 3, 1948
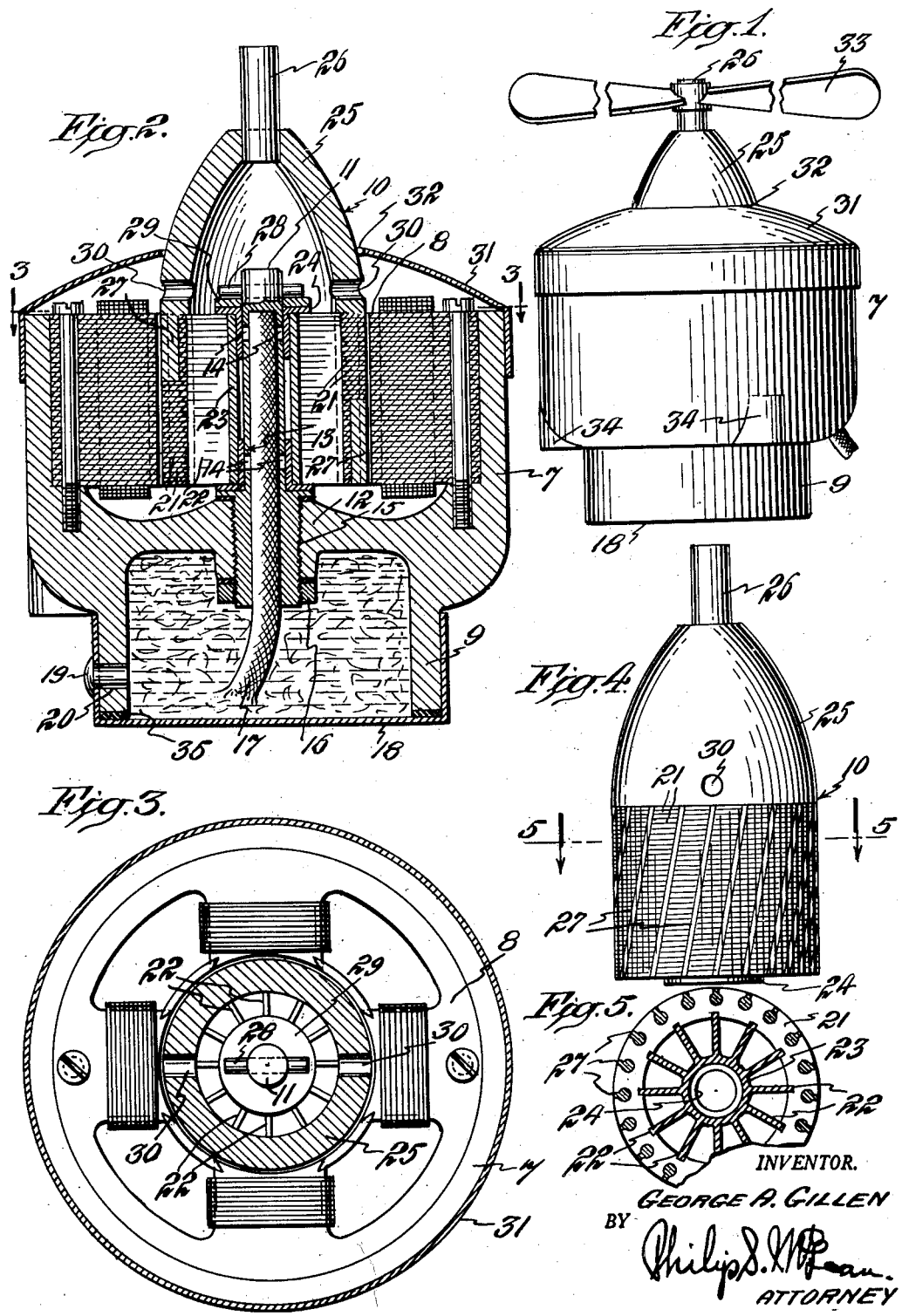
INVENTOR.
GEORGE A. GILLEN
BY
Philip S. McLean
ATTORNEY Patented Mar. 28, 1950

2,501,814

UNITED STATES PATENT OFFICE 2,501,814

ELECTRIC MOTOR

George A. Gillen, New York, N. Y.

Application September 3, 1948, Serial No. 47,669

1 Claim. (Cl. 172—36)

The invention here disclosed relates to induction motors of the squirrel cage rotor type.

Objects of the invention are to provide a motor of this type with a built-in lubricating system designed to assure adequate lubrication practically for the life of the machine.

It is a purpose of the invention to provide and assure such lubrication at a low cost and with an entirely practical structure.

Other special objects of the invention are to provide an improved bearing construction which will maintain the rotor properly balanced, prevent vibration and preserve a close, fixed air gap.

Further objects of the invention are to facilitate assembly of the parts and to provide in the assembled structure a fully finished and neat appearing motor construction.

Other desirable objects attained by the invention are set forth or will appear in the course of the following specification.

The drawing acompanying and forming part of the specification illustrates a present preferred embodiment of the invention but structure may be modified and changed as regards the present illustration, all within the true intent and broad scope of the invention as hereinafter defined and claimed.

Fig. 1 in the drawing is a side elevation of one of the motors used as a fan motor;

Fig. 2 is an enlarged vertical sectional view of the motor;

Fig. 3 is a horizontal sectional view as on substantially the plane of line 3—3 of Fig. 2;

Fig. 4 is a side elevation of the rotor;

Fig. 5 is a transverse sectional view of the rotor as on substantially the plane of line 5—5 of Fig. 4.

The base or frame of the motor is shown constructed to form a complete housing 7 for the stator 8 and a separate, concentrically related chamber 9 for lubricant.

The rotor 10 is journaled on a fixed shaft 11 set in the bottom or back wall 12 of the stator chamber and having a central bore 13 and side outlets 14 for carrying lubricant to the rotor.

In the illustration the fixed supporting shaft for the rotor is shown as screwed at 15 into the partition wall 12 separating the stator chamber from the lubricant chamber and as secured fixed in its vertically adjusted or finally seated relation by a lock nut 16 engaged over the lower projecting end of the same.

A wick is shown at 17 extending up through the tubular portion of the fixed, center supporting shaft, substantially to the closed upper end of the same so as to deliver lubricant to the upper or furthest lubricating openings 14.

The lubricant chamber is shown closed by a bottom or end cap 18 which may be press fitted or otherwise tightly secured over the lower lubricating end of the base.

While the closed lubricating chamber may hold a supply of lubricant sufficient for the useful life of the motor, it is contemplated that for some purposes it may be desirable to provide means enabling refilling or resupplying of lubricant, such as a rubber plug 19 cemented in place in an opening 20 in the side of the chamber and which after long use of the motor may be extracted to permit refilling of the chamber.

The ring laminations 21 of the rotor are shown as engaged over the radiating wings or arms 22 of a spider having a central tubular hub portion 23, into the ends of which the flanged bearing bushings 24 are seated.

The drive is taken off from the rotor in the case illustrated, by a dome shaped member 25 rooted in the peripheral portion of the rotor and carrying at the center of the dome or arch a central drive shaft 26.

A preferred method of attaching the drive member 25 to the rotor laminations is to cast or mold this member integrally with the conductor bars 27 cast in the slots in the rotor laminations. This may be a die casting or centrifugal casting operation for forming at the same time the inductor bars 27 and the shaft carrying drive extension 25.

This may be of a single casting of aluminum or copper or the end piece 25 may be a preformed part integrally connected with the conductor bars by a casting or other suitable operation.

The rotor is shown secured in place on the stationary mounting shaft by a cross pin 28 driven through the solid end portion of this shaft over the thrust washer 29 overstanding the outer bearing bushing of the rotor.

The dome element 25 is shown as having radial openings 30 in opposite sides to enable necessary handling of the securing pin 28. The dome member 25 may be of open instead of the closed construction shown, in which event special pin handling openings 30 may not be necessary.

The upper or outer, open end of the stator housing is shown as closed by an arched and flanged cover plate 31 having a central opening 32 for the driving dome 25.

When used as a fan motor the fan element may be directly applied to the projecting end of the drive shaft 26, as indicated at 33 in Fig. 1. For other purposes this shaft may carry a gear, pulley or the like.

The invention makes it possible to furnish motors at low cost equipped with a built-in lubricating system which generally should last for the life of the motor. This system is effective regardless of the position in which the motor is used, the wick carrying lubricant out through the fixed supporting shaft to the bearing portions at opposite ends of the rotor regardless of the shaft position. The fixed mounting shaft provides a substantially full length, vibrationless bearing for the rotor, enabling the latter to operate with a close air gap of constant, fixed dimensions. The smooth running, vibrationlesss operation enables the motor to be used for special purposes requiring exactness and quietness in operation.

The motor consists of but few parts and these can be produced and assembled at low cost. In its finished condition the motor is completely enclosed and is of neat appearance, enabling its use where the matter of appearance is a factor.

The lubricant chamber portion 9, being of less diameter than the body or shell portion of the base, may be secured in a mounting ring or other form of support for the motor. For this purpose the base may be provided with mounting lugs such as indicated at 34 for the screws to secure the base in the mounting ring or other support.

To insure tight enclosure of the lubricant or the lubricant and wick material within the lubricant compartment, a gasket or sealing ring 35 may be provided for the end cap 18.

What is claimed is:

An electric motor comprising a hollow base having a stator chamber and an adjoining lubricant chamber separated by a partition wall, a fixed supporting shaft seated in said partition wall and projecting into the stator chamber, said shaft being of tubular structure and having lubricant outlets in that portion of the same located in the stator chamber, a wick in the tubular portion of said shaft extending from said lubricant chamber, a rotor journaled to rotate on said fixed supporting shaft and provided with driving means and a stator mounted in the stator chamber about said rotor, said tubular stationary supporting shaft having a stem portion screwed in said partition wall.

GEORGE A. GILLEN.

REFERENCES CITED

The following references are of record in the file of this patent:

UNITED STATES PATENTS

| Number | Name | Date |
|---|---|---|
| 2,048,421 | Ballentine | July 21, 1936 |
| 2,067,155 | Levy et al. | Jan. 5, 1937 |
| 2,141,319 | Sato | Dec. 27, 1938 |